Jan. 12, 1937.   R. W. CAMMACK   2,067,692
HOLDER FOR DENTAL FLOSS
Filed July 18, 1935
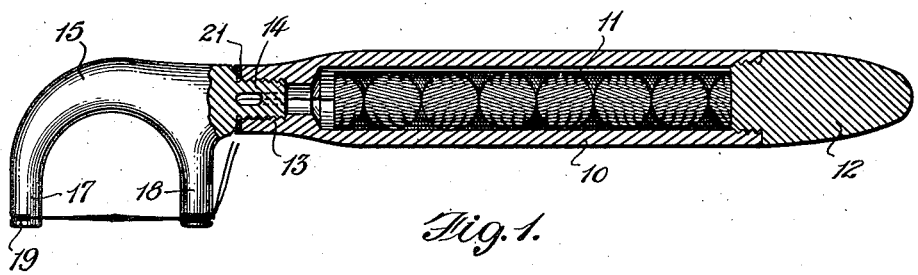
Fig. 1.
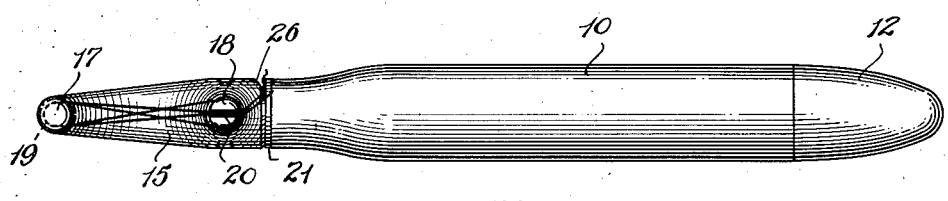
Fig. 2.
Fig. 3.
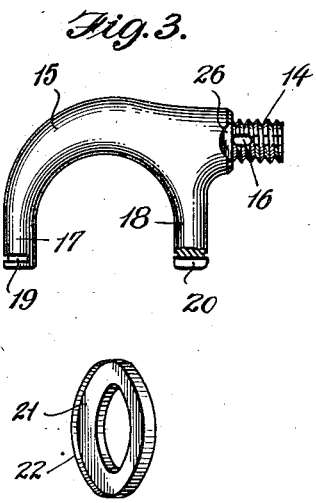
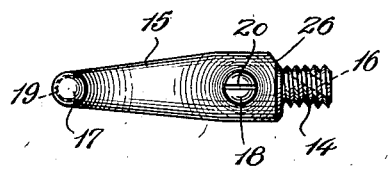
Fig. 4.
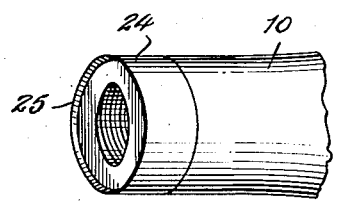
Fig. 5.   Fig. 6.
INVENTOR
R. W. Cammack
BY
ATTORNEY Patented Jan. 12, 1937

2,067,692

UNITED STATES PATENT OFFICE 2,067,692

HOLDER FOR DENTAL FLOSS

Robert W. Cammack, Mount Vernon, N. Y.

Application July 18, 1935, Serial No. 32,111

7 Claims. (Cl. 132—92)

This invention relates to dental floss holders for holding dental floss to be used in removing particles of food or the like which may be lodged between the teeth and more particularly to improvements over the dental floss holders disclosed in my Patents No. 1,588,307 which issued June 8, 1926; No. 1,723,842 which issued August 6, 1929, and No. 1,879,074 which issued September 27, 1932.

The object of the invention in general terms is to provide an improved device of this character which is easy to use and more efficient and which embodies improved means for cutting off the used length of dental floss.

A further object of the invention is to provide a dental floss holder having means for supporting more than one strand of dental floss and more particularly in which the doubled strand is spaced apart at one point and substantially in contact at another point.

A still further object of the invention is to provide a device of this character having improved means for securing the ends of the strand of dental floss in the holder and for cutting the end of the used portion of the strand.

Referring to the accompanying drawing which is made a part hereof:

Fig. 1 is the side elevational view of a floss holder embodying the invention, certain parts being broken away in order to show the construction more clearly, Fig. 2 is a plan view of the holder shown in Fig. 1, Figs. 3 and 4 are side and bottom plan views of the head of the floss holder shown in Figs. 1 and 2, Fig. 5 is a detailed view in perspective to an enlarged scale of the cutting member, and Fig. 6 is a view of further modification in which the cutting member is supported upon the handle.

Referring to Figs. 1 and 2, the dental floss holder comprises the handle 10 which serves as a magazine for a roll 11 of dental floss, one end of the handle being closed by a removable cap or plug 12 which may be removed for replacement of the dental floss. The opposite end of the handle 10 is provided with an internal threaded aperture 13 through which the end of the dental floss is drawn for use.

The threaded portion 13 of the handle 10 is adapted to engage a threaded boss 14 upon a head 15 for supporting the length of dental floss to be inserted in the mouth of the user. The boss 14 is provided with an inclined aperture 16 communicating with the interior of the handle 10 and adapted to receive the end of the strand of dental floss and direct the same in desired relation to the spaced prongs 17 and 18 of the head 15.

As shown more clearly in Figs. 3 and 4, the prongs 17 and 18 are provided at the tip ends thereof with circumferential or partially circumferential slots 19 and the prong 18 is further provided with a radial or straight slot 20. In use a length of the dental floss is doubled around the end of the prong 17 or as shown in Fig. 2 the ends of both prongs, that is two doubles or four individual strands extend between the prongs. When it is desired to use the holder with one pair of strands this pair of strands is held in spaced relation adjacent the prong 17 and substantially in contact adjacent the prong 18 whereby in effect a strand of varying width is provided in order to clean effectively the adjacent sides of the teeth which are slightly separated, for example, as much as one-eighth of an inch apart. On the other hand, the overlying arrangement of the strands of floss adjacent the prong 18 facilitates the insertion of the floss between the teeth. When the additional strands are placed on the prongs, four as shown, the strands are doubled around prong 18 as well as prong 17 and the strand width adjacent to prong 18 is increased. The straight slot 20 provides for the holding of the inner and outer ends of the strands which extend from and back to the connection between the handle and head which secures the ends. The effective width of the strand may be otherwise varied by varying the manner in which the strands are looped around prongs 17 and 18.

In accordance with a further feature of the invention, a substantially circular cutting member or disc 21 is provided, preferably between the handle and the head of the floss holder or adjacent the point where the ends of the cleaning strand are clamped. As shown in Figs. 1 and 5, the cutting member 21 is provided with a central aperture to receive the threaded boss 14 of the head 15 and with the peripheral cutting edge or lip 22 projecting laterally from the central portion of the disc. The diameter of the cutting member although shown as of substantially the same diameter as the parts adjacent thereto, is small enough and preferably slightly less than the diameter of the adjacent end of the handle 10 or head 15 whereby the cutting edge of the cutting member is so positioned as to obviate any possibility of injury to the hand or mouth of the user.

If desired the form of the cutting member may be variously modified and the same may be mounted upon either the handle 10 or head 15 instead of being clamped between the same. Thus as shown in Fig. 6, a cutting member 24 in the form of a collar having a sharp edge 25 may be mounted upon the end of the handle 10. In each instance the cutting member is preferably arranged so as to be capable of twisting or turning with respect to the handle or head of the holder in order to present a new cutting edge in use.

In order to use the device the dental floss is drawn through the aperture 16 of the head 15, then extended through slot 20 of prong 18 and looped around the ends of the prongs 17 and 18, as provided for by the circumferential slots. After looping the floss around the ends of prongs 17 and 18 the end is extended through slot 20 and back to the juncture of head 15 and handle 10 where it is secured in engagement with cutting member 21 by turning the handle and head with respect to each other which also effects a tensioning of the strands between the ends of prongs 17 and 18. As shown in Fig. 3, a portion of the head 15 adjacent the cutting disc is beveled as indicated at 26 in order to prevent cutting the strand of dental floss at the inner end thereof. In order to utilize an unused strand of dental floss the handle 10 is loosened and an unused portion of the floss is drawn through the aperture 16 from the handle and again positioned on the prongs and clamped in the manner described above. As shown in Fig. 2 the inner end of the floss extends up to slot 20 of prong 18 and the free end clamped on the other side of the cutting member entering the notch provided by the beveled portion 26. However, in practice, the manner in which the floss may be threaded may be varied as desired. It will be noted that the outer end is secured adjacent to a cutting edge of the disc as the used end of the strand is cut off by drawing the same across the edge of the cutting disc 21. The provision of a long cutting edge insures a long life before the cutting member becomes dull and has a further advantage that it is unnecessary to manipulate the strand carefully as in the case of cutting notch in order to sever the same. The form of cutting disc shown is particularly advantageous in that cutting of the floss is prevented until the same is drawn against the cutting edge by the user and the said cutting edge is so located that it will not cut or injure the hand or mouth of the user.

The arrangement of holder providing for two or more strands of floss is advantageous as pointed out above and further because both ends of the floss are held at one point so that the device is easily manipulated. It will be further noted that neither of the supporting prongs is provided with an internal aperture as in previous devices of this character so that the holder is more easily cleaned and kept clean. The doubling of the floss further affords greater wear and is more economical to use in addition to being more effective and efficient. A quantity of tooth paste or powder may be readily applied to the doubled floss to increase its effectiveness. When the floss is described as "doubled", the language is intended to define two or more strands of floss.

Various modifications in the form and arrangement of the parts of the floss holder described for purposes of illustration will occur to those skilled in the art and may be made without departing from the scope of the invention as defined in the appended claims.

I claim:—

1. A dental floss holder comprising a head having spaced prongs thereon, means for securing a length of floss in the head with a portion thereof engaging on said prongs and a substantially circular cutting member adjacent said head, said member having a cutting edge extending entirely around its periphery.

2. A dental floss holder comprising a head having spaced prongs thereon, means for securing a length of floss in the head with a portion thereof engaging on said prongs and a cutting disk on said holder, said disk having a cutting edge extending entirely around its periphery.

3. A dental floss holder comprising a head having spaced prongs thereon, a handle detachably secured to said head, and a disk having a cutting edge around the entire periphery thereof for the floss clamped between said head and handle.

4. A dental floss holder comprising a head having spaced prongs thereon, a handle detachably secured to said head, and a disk with a cutting edge around its periphery on said holder adapted to turn thereon to present a new cutting surface.

5. A dental floss holder comprising a head having spaced prongs thereon, a handle for the holder having a threaded socket, said head having a threaded boss adapted to engage the socket in the handle, and a disk having a cutting edge around the periphery thereof clamped between said head and handle.

6. A dental floss holder comprising a head having spaced prongs thereon and a threaded boss, a hollow handle serving as a magazine for the dental floss and engaging said boss, a cutting disk clamped between said head and handle and arranged to clamp the ends of the floss, said head being outwardly beveled adjacent the boss to obviate cutting the floss upon tightening the handle in said head.

7. A dental floss holder comprising a head having spaced solid prongs thereon, a handle threaded into said head providing a floss magazine and having a passageway through which the floss may be drawn at the intersection of the head and handle, a cutting member mounted between said head and handle, means on the prong tips for mounting a doubled strand of the floss therebetween having active portions of varying widths therebetween, and said threaded intersection between the head and handle providing a clamping and tensioning means engaging both ends of the floss strand and also clamping the floss in engagement with said cutting means.

ROBERT W. CAMMACK.